US011558380B2

(12) United States Patent
Kaidi

(10) Patent No.: US 11,558,380 B2
(45) Date of Patent: Jan. 17, 2023

(54) DEFENDING MULTI-FACTOR AUTHENTICATION AGAINST PHISHING

(71) Applicant: PayPal, Inc., San Jose, CA (US)

(72) Inventor: George Chen Kaidi, Singapore (SG)

(73) Assignee: PayPal, Inc., San Jose, CA (US)

( * ) Notice: Subject to any disclaimer, the term of this patent is extended or adjusted under 35 U.S.C. 154(b) by 240 days.

(21) Appl. No.: 16/953,115

(22) Filed: Nov. 19, 2020

(65) Prior Publication Data

US 2022/0158999 A1    May 19, 2022

(51) Int. Cl.
*H04L 9/40*    (2022.01)

(52) U.S. Cl.
CPC ...... *H04L 63/0884* (2013.01); *H04L 63/0823* (2013.01); *H04L 63/0853* (2013.01); *H04L 63/1466* (2013.01); *H04L 63/1483* (2013.01)

(58) Field of Classification Search
CPC ............. H04L 63/0884; H04L 63/0823; H04L 63/0853; H04L 63/1466; H04L 63/1483; H04L 2463/082; H04W 12/63; H04W 12/66
See application file for complete search history.

(56) References Cited

U.S. PATENT DOCUMENTS

| | | | |
|---|---|---|---|
| 2008/0212771 A1 | 9/2008 | Hauser | |
| 2009/0210712 A1* | 8/2009 | Fort | H04L 63/1441 |
| | | | 713/175 |
| 2011/0197070 A1* | 8/2011 | Mizrah | H04L 63/0869 |
| | | | 713/176 |
| 2014/0331278 A1 | 11/2014 | Tkachev | |
| 2016/0255069 A1 | 9/2016 | Dickinson et al. | |
| 2017/0353482 A1 | 12/2017 | Sommer | |

OTHER PUBLICATIONS

International Search Report and Written Opinion in PCT Appl. No PCT/US2021/072426 dated Mar. 21, 2022, 11 pages.

* cited by examiner

*Primary Examiner* — Huan V Doan
(74) *Attorney, Agent, or Firm* — Kowert, Hood, Munyon, Rankin & Goetzel, P.C.; Gareth M. Sampson; Dean M. Munyon

(57) ABSTRACT

Techniques are disclosed relating to detecting and prevent phishing attacks (such as man-in-the-middle attacks) related to multi-factor authentication (MFA) or two-factor authentication (2FA) processes. A system is described that makes a determination of whether to permit or deny a subsequent authentication step (e.g., a 2FA authentication step) based on a level of trust determined between the computing device making the initial authentication request to a service computer system and the computing device being asked to implement the subsequent authentication step (such as a mobile device). The computing device associated with the subsequent authentication step assesses the trust between the devices and makes the determination of whether to permit or deny the subsequent authentication step. The present techniques enhance computer system security against phishing attacks while maintaining a satisfying user experience for legitimate users.

20 Claims, 10 Drawing Sheets

DEFENDING MULTI-FACTOR AUTHENTICATION AGAINST PHISHING

BACKGROUND

Technical Field

This disclosure relates generally to methods of accessing online systems, and more particularly to assessing trust between devices during multi-factor authentication security authentication processes, according to various embodiments.

Description of the Related Art

Online computer systems are ubiquitous today, providing various different types of services. Access to security systems, files, accounts, the ability to perform financial transactions, and other functionality may be provided via a web interface, for example. Online systems that provide such functionality, including transaction processing systems, may unfortunately be subject to malicious attempts to breach account security and/or obtain unauthorized information. These malicious attempts can take a variety of forms, including phishing attacks that attempt to obtain user account information for access to the online system. Applicant recognizes that there is an opportunity to provide improved authentication mechanisms, and provides solutions discussed below.

Figure 1:
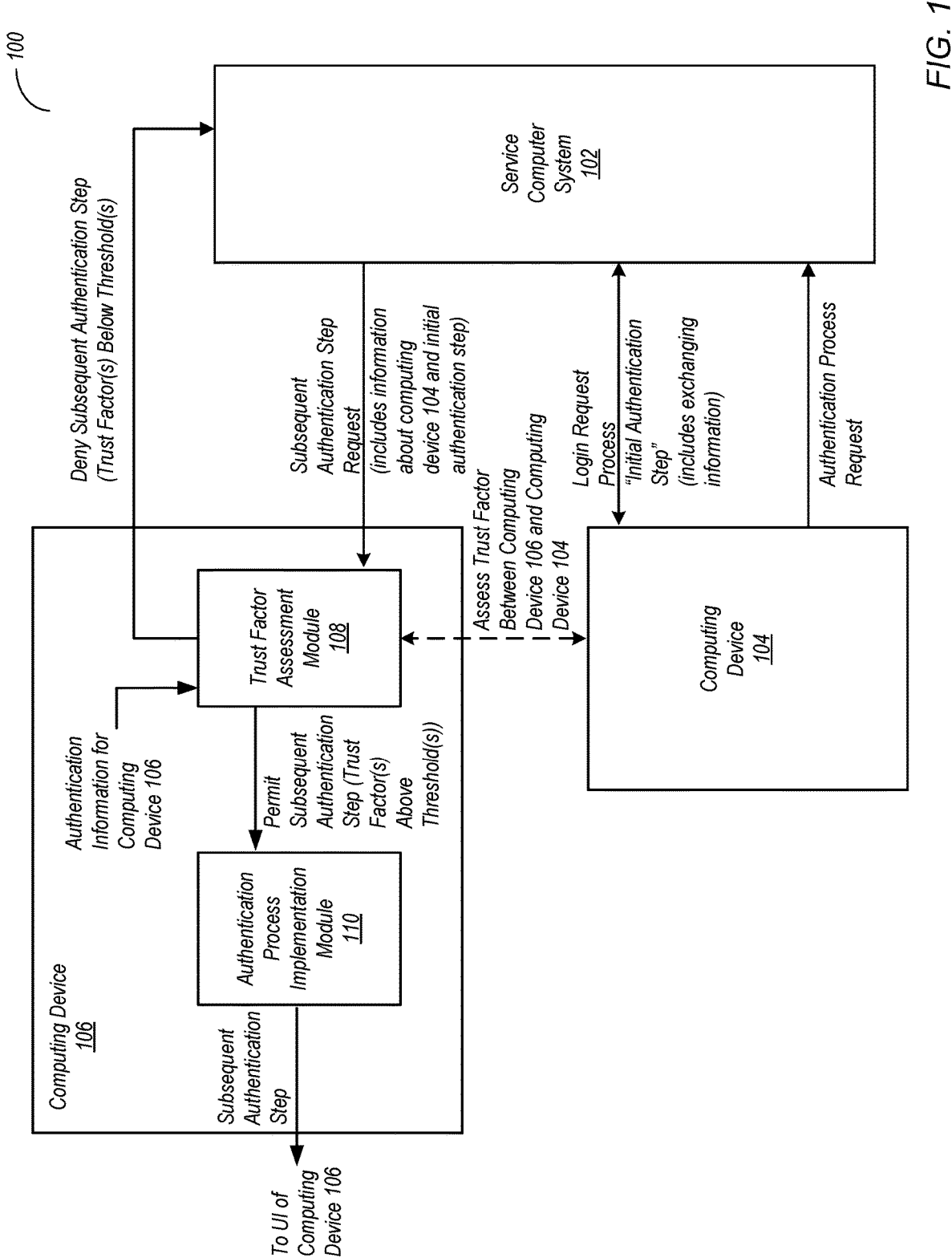
FIG. 1 is a block diagram of a system for determining trust between computing devices for an authentication process associated with a service computer system, according to some embodiments.

Although the embodiments disclosed herein are susceptible to various modifications and alternative forms, specific embodiments are shown by way of example in the drawings and are described herein in detail. It should be understood, however, that drawings and detailed description thereto are not intended to limit the scope of the claims to the particular forms disclosed. On the contrary, this application is intended to cover all modifications, equivalents and alternatives falling within the spirit and scope of the disclosure of the present application as defined by the appended claims.

This disclosure includes references to "one embodiment," "a particular embodiment," "some embodiments," "various embodiments," or "an embodiment." The appearances of the phrases "in one embodiment," "in a particular embodiment," "in some embodiments," "in various embodiments," or "in an embodiment" do not necessarily refer to the same embodiment. Particular features, structures, or characteristics may be combined in any suitable manner consistent with this disclosure.

Reciting in the appended claims that an element is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors.

As used herein, the terms "first," "second," etc. are used as labels for nouns that they precede, and do not imply any type of ordering (e.g., spatial, temporal, logical, etc.), unless stated otherwise. As used herein, the term "or" is used as an inclusive or and not as an exclusive or. For example, the phrase "at least one of x, y, or z" means any one of x, y, and z, as well as any combination thereof (e.g., x and y, but not z). In some situations, the context of use of the term "or" may show that it is being used in an exclusive sense, e.g., where "select one of x, y, or z" means that only one of x, y, and z are selected in that example.

In the following description, numerous specific details are set forth to provide a thorough understanding of the disclosed embodiments. One having ordinary skill in the art, however, should recognize that aspects of disclosed embodiments might be practiced without these specific details. In some instances, well-known, structures, computer program instructions, and techniques have not been shown in detail to avoid obscuring the disclosed embodiments.

DETAILED DESCRIPTION

The present disclosure is directed to various techniques related to the detection and prevention of malicious attempts to obtain confidential user account information in order to gain unauthorized access to online systems. Online systems (e.g., payment processing systems, social network systems, etc.), may frequently be subjected to malicious attempts such as phishing attacks to obtain access credentials for user accounts. Phishing attacks (as may occur in phishing campaigns that include one or more particular phishing attacks on one or more accounts) may utilize electronic communications (such as emails) that attempt to obtain confidential user account information by disguising themselves as trustworthy communications. Phishing electronic communications may include, for example, email spoofing, instant messaging, or text messaging that directs a user to a fake web page where the user is asked to enter personal information, such as account login information. The fake web page is created to look or feel like a legitimate web page for an online system. A phishing electronic communication can more broadly include any electronic communication that is intended to deceive a user into providing personal or confidential information in response to the electronic communication.

For attacks directed at an online system, phishing electronic communications may be used to obtain account login information and gain unauthorized access to the online system by a malicious party. Once unauthorized access to the online system is gained, the malicious party may attempt to obtain private information, make account changes, or generate lateral attacks on other users with accounts in the online system.

Online systems, including transaction systems, may be subject to high volumes of phishing attacks. Phishing attacks may be especially abusive for transaction systems that handle financial information for users, such as payment processing systems. Many online systems implement multi-factor authentication (MFA)(e.g., two-factor authentication (2FA)) to counter against phishing attacks. MFA or 2FA are perceived to be highly resistant against phishing attacks. The present inventor has realized, however, that online systems utilizing MFA or 2FA may still be vulnerable to some types of phishing attacks. One example of a phishing attack that may defeat MFA or 2FA is a "man-in-the-middle" (MITM) attack. A MITM attack is when an attacker intercepts one or more communications between two parties and uses that information for malicious ends. Note that as used herein, the terms multi-factor authentication (MFA) and two-factor authentication (2FA) can be used interchangeably in some embodiments.

Briefly, a MITM attack in the context of a phishing attack may include directing a user to a phishing web page (e.g., through an email communication) where the user enters his/her login credentials. The phishing web page may pass this information on to an attacker's session for the actual login attempt, which generates a 2FA request (such as a challenge request) on a user's device (e.g., the user's mobile device). The user then approves the 2FA request, thereby providing access to the online system for the attacker. The phishing web page may return a login error indication to the user and have the user retry to login. The user may be allowed to succeed on the retry in order to avoid suspicion of a MITM phishing attack. Further detail of an example MITM phishing attack is provided in the illustrated embodiment of FIG. 4, described below.

Another example of a phishing attack that may defeat MFA or 2FA includes situations where a user is indiscriminate about approving a request for MFA or 2FA. In such situations, the user may receive a random 2FA request initiated by an attacker's attempt to login into the user's account and not initiated by the user himself/herself. If the user indiscriminately or instinctively approves the random 2FA request without realizing that he/she did not initiate the request, the attacker may gain access to the user's account on the online system.

Detecting MITM phishing attacks and the source(s) of the attacks may be useful in helping prevent the current attacks or future attacks on the online systems. Detecting MITM phishing attacks may, however, be difficult to detect using current methodology. Additionally, even if a MITM phishing attack is detected, preventing access and stopping the attack may be difficult due to being unable to readily differentiate the attack attempt from a legitimate access attempt. The present disclosure contemplates various techniques for detecting MITM phishing attacks (and other phishing attacks that may overcome MFA or 2FA) and prevent the attack from successfully gaining access to the online system while providing minimal disruption to legitimate user access attempts.

One embodiment described herein has two broad components: 1) assessing a trust factor between a first computing device (e.g., a mobile device) and a second computing device where the second computing device has initiated the authentication process for the online system and where the trust factor is assessed by the first computing device based on authentication information received during an authentication step (e.g., a first authentication step) in the authentication process performed on the second computing device and authentication information stored by the first computing device, and 2) inhibiting an authentication step from being performed on the first computing device (e.g., the 2FA authentication step) when there is insufficient trust between the first computing device and the second computing device based on the assessed trust factor. As used herein, the term "trust factor" refers to an indication of trust (such as a level of trust) between devices that is determined based on an assessment of information or data associated with the devices. Examples of a trust factor include, but are not limited to, a scalar or discrete value that provides a measure of trust between devices or a value associated with a binary decision (such as a value of 0 or 1), or multiple discrete or defined values (e.g. "low", "medium", and "high"). In embodiments described herein, assessing the trust factor includes assessing comparable data in the authentication information received during the first authentication step and the authentication information stored by the first computing device. Examples of comparable data include internet protocol (IP) addresses (either LAN addresses or WAN addresses), geographic locations, certificate information, cookies, digital tokens, (e.g., autofill tokens), or challenge keys (such as certificates or agents on client-side devices or browsers). In various embodiments, when the assessed trust factor fails to satisfy a specified threshold, the first computing device may deny the 2FA authentication step from proceeding on the first computing device. Additionally, the first computing device may provide, to the online system, an indication that the 2FA authentication step has been denied and that a security incident has occurred. In some embodiments, the online system may provide a diversionary notification to the second computing device to conceal from the attacker that the phishing attack has been detected.

In short, the present inventor has recognized the benefits of detecting phishing attacks on an MFA/2FA process based on a determination made by a computing device being used for a second (or later factor) authentication step. The computing device being used for the second authentication step may make a determination of trust between itself and another computing device that initiated the MFA/2FA process. The determination of trust may then be used to permit or deny the second authentication step to proceed on the computing device being used for the second authentication step. With both the determination of trust and the decision to permit or deny the second authentication step made on the computing device being used for the second authentication step, previously undetected phishing attacks may be detected. Additionally, the phishing attacks may be detected and prevented (e.g., denied) without any knowledge of the detection by a legitimate user or an attacker. For example, the legitimate user may never see the second authentication step when a phishing attack is detected and prevented. The attacker is concealed from knowledge of the detection by a diversionary page (or other disguise) that hides the fact that the attack has been detected.

FIG. 1 is a block diagram of a system for determining trust between computing devices for an authentication process associated with a service computer system, according to some embodiments. In the embodiment shown in FIG. 1, system 100 includes service computer system 102, computing device 104, and computing device 106. As used herein, the term "service computer system" refers to any computer system that implements a service in which two or more parties use computer systems to exchange information. Accordingly, a "service" according to this disclosure may include a transaction service, a payment service (e.g., PAYPAL), a social network, a file transfer service, an online retailer, a dating site, and so on. Note that generally, this disclosure may include various examples and discussion of techniques and structures within the context of a "service computer system." Note that all these examples, techniques, and structures are generally applicable to any online system that allows access requests (e.g., authentication process requests) and the exchange of information to provide services to a user. For example, service computer system 102 may be any online system in some instances. However, the term service computer system is used for ease of understanding in various portions of this disclosure.

Computing device 104 and computing device 106 may be user computing devices. For example, computing device 104 or computing device 106 may be a client computing device used by a user to access user account(s) located on service computer system 106 and exchange information with user the service computer system. In certain embodiments, requests by computing device 104 or computing device 106 to access user account(s) includes user account login requests or other access requests that may be to access particular resources or functionality without reference to a specific user account. Computing device 104 and computing device 106 may communicate with service computer system 102 over a wide-area network such as the Internet. Communication may, however, occur via computer network coupled to service computer system 102.

In certain embodiments, a user uses an account login request page (e.g., interface) to attempt to access a user account on service computer system 102. The account login request page may be accessed by the user via a web browser on computing device 104 or computing device 106. For example, the user may use the web browser to remotely access the account login request page, which is displayed in the web browser. The user may then attempt to login to service computer system 102 using the account login request page displayed in the web browser. Other embodiments for accessing the account login request page may also be contemplated as the disclosure may not be limited to these particular examples.

Figure 2:
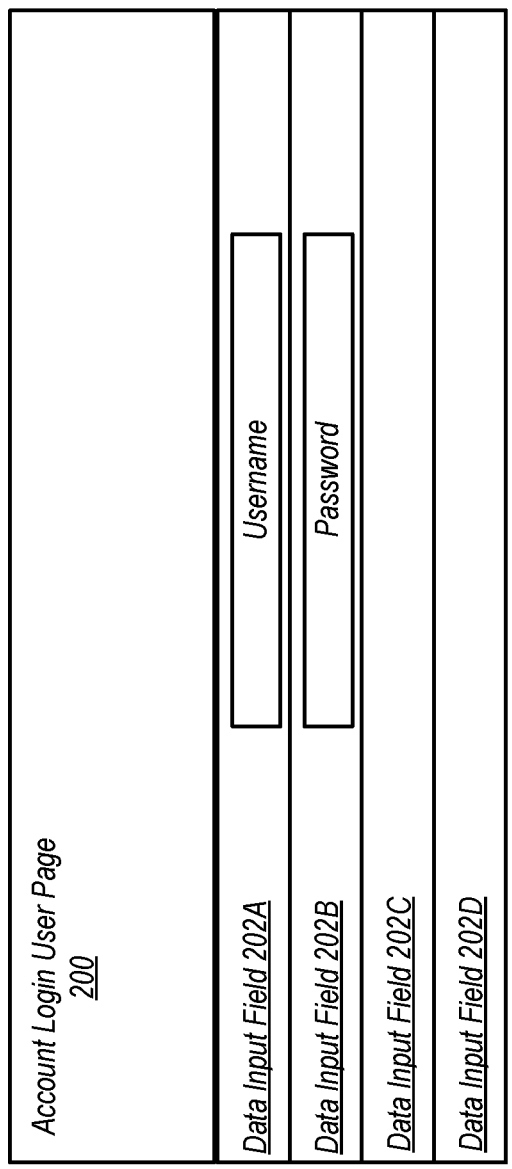
FIG. 2 depicts a representation of an example an account login request page, according to some embodiments.

FIG. 2 depicts a representation of an example an account login request page, according to some embodiments. Account login request interface 200 may include one or more data input fields 202 (e.g., data input fields 202A, 202B, 202C, and 202D, otherwise referred to collectively as "202A-D"). In certain embodiments, data input fields 202 are fields requesting inputs of profile information associated with the user requesting login access to transaction system 100. Data input fields 202 may be, for example, form-fillable data input fields or pull-down menu data fields (such as form entry buttons). In some embodiments, data input fields 202 may request account login credentials for the user of service computer system 102. For example, as shown in FIG. 2, data input field 202A may request a username for the user's account and data input field 202B may request a password associated with the username. Other embodiments of requests for data input fields 202 may also be contemplated as the disclosure may not be limited to these particular examples. Examples of other requests for data input fields 202 include, but are not limited to, email address, zip code, phone number, pin code, date of birth, challenge questions (such as answers to specific questions previously asked of the user during account creation), and an input implemented to verify a human input (e.g., a security procedure such as a Captcha process).

Returning to FIG. 1, in the illustrated embodiment, computing device 104 initiates an authentication process request (e.g., account login request) to service computer system 102. In response to receiving the authentication process request, service computer system 102 may operate a login request process via the account login request page on a web browser on computing device 104. The login request process may include exchanging information between computing device 104 and service computer system 102 to attempt to authenticate the user for the user account on the service computer system. Information that may be exchanged includes, but is not limited to, username, password, internet protocol (IP) address of computing device 104 (LAN address or WAN address), geographic location of computing device 104, cookie information on computing device 104, challenge keys (such as certificates or agents on client-side devices or browsers), digital tokens, (such as autofill tokens), and other data input requests described herein.

Service computer system 102 may assess the information exchanged in the login request process to make a determination whether to approve or deny the login request by computing device 104. In certain embodiments, as shown in FIG. 1, service computer system 102 implements a multi-factor authentication (MFA) process or a two-factor authentication (2FA) process in determining whether to approve or deny the login request by computing device 104. As used herein, a multi-factor authentication (MFA) process is an electronic authentication process where access is granted (e.g., the user is authenticated) only after two or more security factors (e.g., evidence) are authenticated. The security factors authenticated may include, but not be limited to, knowledge (e.g., something only the user knows such as username/password), possession (e.g., something only the user has such as a mobile device), and inherence (e.g., something that is only applicable to the user). As used herein, a two-factor authentication (2FA) process is a subset of an MFA where access is granted after two security factors are authenticated. Both MFA and 2FA processes may be implemented using a single computing device or multiple computing devices.

In embodiments with an MFA process or a 2FA process, the login request process between service computer system 102 and computing device 104 is the "initial authentication step" (e.g., first authentication step) in the MFA/2FA process. In the illustrated embodiment, service computer system 102 contacts computing device 106 to request a "subsequent authentication step" in the MFA process or 2FA process. In a 2FA process embodiment, the subsequent authentication step may be the second and final step in the authentication process. In an MFA process embodiment, the subsequent authentication step may be any step after the initial step in the authentication process. For example, the subsequent authentication step may be a final authentication step implemented after intermediate authentication step(s) or the subsequent authentication step may be an intermediate authentication step.

In some embodiments, computing device 106 is a trusted device authorized to provide the subsequent authentication step in an MFA or 2FA process for the user account attempting to be accessed. For example, computing device 106 may be a pre-specified device to be contacted for implementing the MFA or the 2FA process for the user account attempting to be accessed. In some embodiments, computing device 106 is a device identified by a user during an account creation process to be used as a device for the MFA or the 2FA process.

In certain embodiments, computing device 106 is a mobile device. A mobile device may be a small multipurpose computing device including any of various types of a computer system device that is mobile or portable and is capable of performing wireless communication. Examples of mobile devices include, but are not limited to, cell phones, smartphones, pad or tablet computing devices, laptop, netbook, notebook, subnotebook, and ultrabook computers. Various other types of devices may fall into this category if they include wireless or RF communication capabilities (e.g., Wi-Fi, cellular, and/or Bluetooth), such as portable gaming devices, portable Internet devices, and other handheld devices, as well as wearable devices. As described herein, the term "mobile device" may be defined to encompass any multipurpose electronic, computing, and/or telecommunications device (or combination of devices) that is easily transported by a user and is capable of wireless communication (using, for example, WLAN, Wi-Fi, cellular, and/or Bluetooth), where the device's primary purpose is telecommunication, computing, and/or electronic gaming.

In the illustrated embodiment, computing device 106 includes trust factor assessment module 108 and authentication implementation module 110. In some embodiments, trust factor assessment module 108 and authentication implementation module 110 may be implemented in an application associated with service computer system 102 (e.g., an API associated with service computer system 102). The subsequent authentication step request from service computer system 102 is received in trust factor assessment module 108 on computing device 106. In certain embodiments, the subsequent authentication step request includes information about computing device 104 and the initial authentication step. For example, information in the subsequent authentication step request may include, but not be limited to, the internet protocol (IP) address of computing device 104 (LAN address or WAN address), the geographic location of computing device 104, cookie information on computing device 104, challenge key results for computing device 104 (such as certificates or agents on client-side devices or browsers), or digital tokens (such as autofill tokens and latency of autofill).

Figure 3:
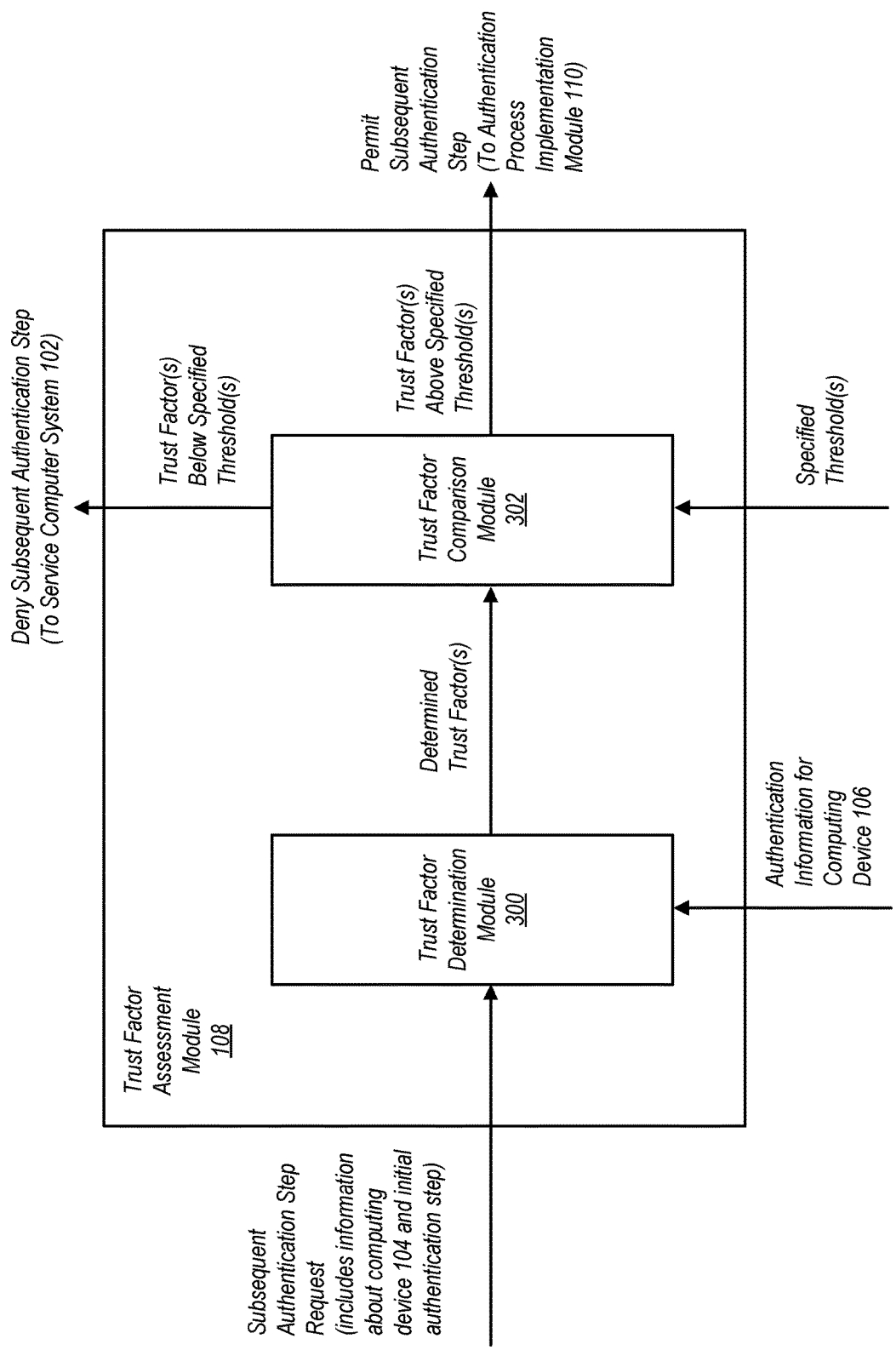
FIG. 3 depicts a block diagram of a trust factor assessment module, according to some embodiments.

FIG. 3 depicts a block diagram of trust factor assessment module 108, according to some embodiments. Trust factor assessment module 108 may assess a trust factor between computing device 106 and computing device 104 (as shown by the dashed line in FIG. 1). In certain embodiments, trust factor assessment module 108 includes trust factor determination module 300 and trust factor comparison module 302. Trust factor determination module 300 may receive the information about computing device 104 and the initial authentication step from the subsequent authentication step request. Trust factor determination module 300 may also access or receive information for computing device 106 (e.g., from a memory or other systems on the computing device). The information for computing device 106 may include comparable data to the information about computing device 104 and the initial authentication step. For example, the information for computing device 106 may include, but not be limited to, the internet protocol (IP) address of computing device 106 (LAN address or WAN address), the geographic location of computing device 106 (based on GPS, GSM, or WiFi location), cookie information on computing device 106, challenge key results for computing device 106 (such as certificates or agents on client-side devices or browsers), or digital tokens (such as autofill tokens and latency of autofill).

In certain embodiments, trust factor determination module 300 assesses comparable data in the information about computing device 104 and the initial authentication step and in the information for computing device 106 to determine one or more trust factors between computing device 106 and computing device 104. For example, similarities or matching between the comparable data may be assessed to determine the trust factor(s) between computing device 106 and computing device 104. In some embodiments, the closer the similarities (e.g., the closer the matches) between the comparable data, the higher the trust factor(s) between computing device 106 and computing device 104.

In the illustrated embodiment, the determined trust factor(s) are provided to trust factor comparison module 302. Trust factor comparison module 302 may compare the determined trust factor(s) to one or more specified thresholds to determine whether to permit the subsequent authentication step or deny the subsequent authentication step. For example, if the determined trust factor(s) satisfy the specified threshold(s) (such as the trust factor(s) being above the specified threshold(s)), then trust factor comparison module 302 permits the subsequent authentication step to proceed (and trust factor assessment module 108 outputs an indication to permit the subsequent authentication step to authentication process implementation module 110, as shown in FIG. 1). If the determined trust factor(s) fail to satisfy the specified threshold(s) (e.g., the trust factor(s) are below the specified threshold(s)), then trust factor comparison module 302 denies the subsequent authentication step from proceeding (and trust factor assessment module 108 may output an indication to deny the subsequent authentication step to service computer system 102, as shown in FIG. 1).

As described herein, the determination and the output to permit or deny the subsequent authentication step to proceed is made without any awareness of the decision being made to the user other than when the subsequent authentication step is permitted and the user interacts with computing device 106 to complete the subsequent authentication step. In addition, the decision made on computing device 106 by trust factor assessment module 108 is made without any communication between computing device 106 and computing device 104. Thus, when the subsequent authentication step is denied, both the user of computing device 106 and the user of computing device 104 may be unaware of the decision being made by computing device 106 and any denial ever happening. The only decision that may be apparent to the user of computing device 106 is when the subsequent authentication step is permitted and the user is prompted by computing device 106 to proceed with the subsequent authentication step. Additionally, as described herein, the decision to permit or deny the subsequent authentication step is made on computing device 106, without any additional interaction with service computer system 102 needed after computing device 106 receives the subsequent authentication step request. Having computing device 106 determine whether to permit or deny the subsequent authentication step without additional communication with service computer system 102 increases the speed and efficiency of the decision to permit or deny, thereby creating a better user experience.

In certain embodiments, the specified threshold(s) are predetermined on computing device 106. For example, the specified threshold(s) may be determined by an application operating on computing device 106 (such as the API associated with service computer system 102). In some embodiments, the specified threshold(s) may be varied on computing device 106. For example, the specified threshold(s) may be changed based on a location of computing device 106 (such as whether the computing device is on a known WAN). The specified threshold(s) may also be updated or changed after a subsequent authentication step is permitted or denied.

Returning to trust factor determination module 300, the trust factor(s) may be determined based on various assessment scenarios of comparable data for computing device 106 and computing device 104. The specified threshold(s) used in trust factor comparison module 302 may also vary in accordance to the various assessment scenarios of comparable data implemented in trust factor determination module 300. Various embodiments of assessment scenarios of comparable data to determine trust factor(s) and their corresponding specified threshold(s) are contemplated herein.

In some contemplated embodiments, a trust factor is determined using a single set of comparable data. As one example, a location of computing device 104 may be compared to a location of computing device 106 to determine the trust factor. The location may be determined based on data such as GPS data for the computing devices or other location-based data such as ASN (autonomous system number). In such embodiments, the closer the locations of the computing devices, the higher the trust factor. Additionally, the specified threshold may correspond to a distance range allowed between computing device 104 and computing device 106 to ensure a secure level of trust between the devices.

In other contemplated embodiments, the trust factor is determined using a single set of comparable data and the comparable data is used in a binary decision to determine whether to permit or deny the subsequent authentication step. For example, an assessment of the WAN IP address of computing device 104 and the WAN IP address of computing device 106 may be used to determine whether to permit or deny the subsequent authentication step. In such embodiments, the trust factor is determined based on whether the WAN IP address of computing device 104 matches the WAN IP address of computing device 106 and the trust factor is 0 if the addresses do not match and 1 if the addresses do match. The specified threshold may then be either satisfied or not satisfied based on the binary value. Other examples of comparable data that may be used for a binary decision include, but are not limited to, LAN IP addresses, device fingerprints (e.g., computing device 104 and computing device 106 are the same device based on their device fingerprints (such as media access control (MAC) addresses)).

In yet other contemplated embodiments, the trust factor is determined using trust factors from individual sets of comparable data and combining the trust factors to determine an overall trust factor. For example, trust determination module 300 may determine a first trust factor from the GPS locations of computing device 104 and computing device 106 and a second trust factor may be determined from the locations of computing device 104 and computing device 106 based on GSM or WiFi signals of the computing devices. The first trust factor and the second trust factor may be combined to determine the overall trust factor that is compared to a specified threshold in trust factor comparison module 302. In some embodiments, the overall trust factor is determined from a combination of individual sets of comparable data. For example, the overall trust factor may be determined from a combination of the GPS locations and the locations based on GSM or WiFi signals of computing device 104 and computing device 106.

In some contemplated embodiments, individual trust factors are compared to individual thresholds in trust factor comparison module 302. For example, as described above, trust determination module 300 may determine a first trust factor and a second trust factor based on different location determinations. In trust factor comparison module 302, the first trust factor may be compared to a first specified threshold and the second trust factor may be compared to a second specified threshold. The determination of whether to permit or deny the subsequent authentication step may be based on both comparisons. For example, both the first and second trust factors may need to satisfy their respective trust thresholds to permit the subsequent authentication step to proceed. Thus, if either the first or second trust factor fails to satisfy its corresponding specified threshold, the subsequent authentication step is denied.

In some contemplated embodiments, a trust factor may be determined based on a determination whether there is a trusted association between computing device 106 and computing device 104. For example, an email account being used on computing device 106 may be compared to an email account being used on computing device 104. If the computing devices are logged into the same email account, the trust factor may be determined to be higher between the computing devices. Further trust may be determined if the email accounts are associated with a trusted service (e.g., the email accounts are associated with service computer system 102).

Another trusted association scenario between computing device 106 and computing device 104 may be whether the IP address (either WAN or LAN) of computing device 104 has been used in a previous determination. For example, if the IP address has been used before, it may generate a higher trust factor. As another example, if the IP address has accessed an email account associated with computing device 106, the trust factor generated may be higher. In another contemplated embodiment, latency of information being provided may be used in a trust factor determination. For example, a digital token may be used to autofill a data input field during an authentication step. The latency of filling the data input field may be used in the determination of the trust factor (higher or lower latency being more trusted may be depend on the scenario being assessed).

In some embodiments, computing device 106 may have to request additional information from service computer system 102 to determine the trust factor(s). For example, computing device 106 may need information regarding reputations of IP addresses (such as whether an IP address has been flagged for suspicious behavior on service computer system 102).

While various possible scenarios for determining the trust factor(s) and comparing the trust factor(s) to their corresponding specified threshold(s) are described herein, it should be understood that additional scenarios for determining the trust factor(s) and comparing the trust factor(s) to their corresponding specified threshold(s) may be contemplated by a person of skill in the art based on the description herein. For example, combinations of any of the various possible scenarios described herein may be contemplated to determine the trust factor(s) and compare the trust factor(s) to their corresponding specified threshold(s).

Returning to FIG. 1, the assessment of the trust factor by trust factor assessment module 108 may need to be made only once or only periodically between a specific computing device 104 (e.g., the computing device initiating the authentication process) and computing device 106 (e.g., the computing device determining whether to permit or deny the subsequent authentication step in the MFA/2FA process). For example, once the determination of trust is made between computing device 104 having some specific identifying information (such as a specific device fingerprint), the determination of trust between computing device 104 and computing device 106 may be made permanent or put in place for a specified period of time. Thus, when computing device 106 receives a request for a subsequent authentication step associated with computing device 104, computing device 106 may more quickly proceed with permitting the subsequent authentication step. Information about the prior determinations of trust may be stored, for example, on a memory of computing device 106 for retrieval when a request for a subsequent authentication step is received.

As described herein, the present inventor has recognized that implementation of system 100, shown in FIG. 1, may be useful in detecting and preventing phishing attacks that attempt to overcome an MFA or 2FA process. System 100 may automatically detect and prevent a phishing attack without a legitimate user (e.g., the user of computing device 106) being aware of the attempted attack (e.g., the user may be unaware of the subsequent authentication step being denied in response to the attempted attack). Further, as described herein, system 100 may also detect and prevent the phishing attack without the attacker (e.g., the malicious party user of computing device 104) becoming aware that the attack has been detected and is being prevented by computing device 106.

Figure 4:
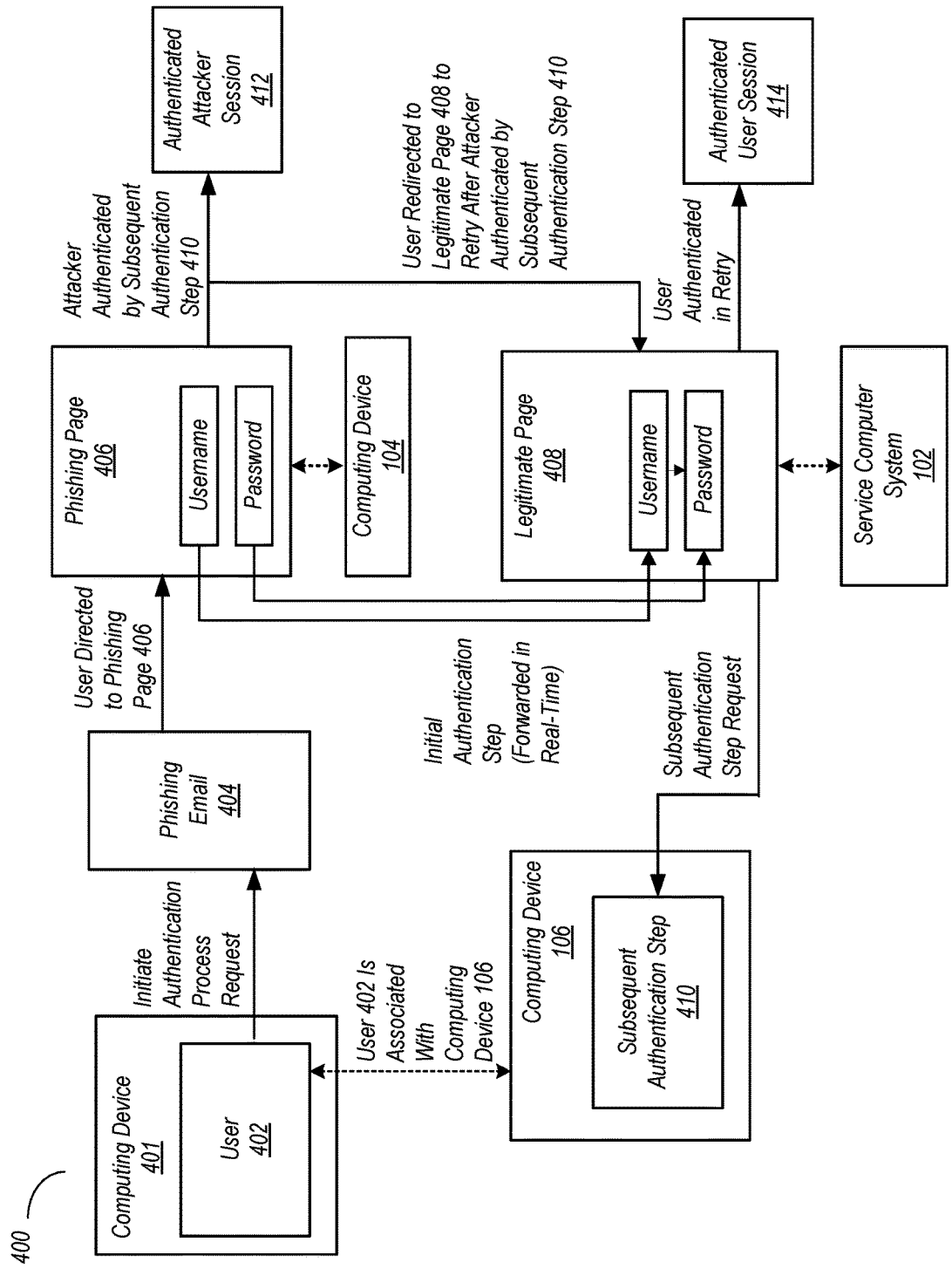
FIG. 4 depicts a block diagram of an example of an embodiment of a phishing attack attempting to overcome a 2FA process.

FIG. 4 depicts an example of an embodiment of a phishing attack attempting to overcome a 2FA process. In attack 400, user 402, on computing device 401, initiates an authentication process request through phishing email 404. Phishing email 404 may be, for example, an email sent by an attacker, associated with computing device 104, to prompt user 402 to login or attempt to login into their account on service computer system 102. Phishing email 404, however, directs user 402 to phishing page 406 (which is associated with or controlled by computing device 104) instead of legitimate page 408. Phishing page 406 may be accessed by user 402 through a web browser on the user's computing device 401. Phishing page 406 may be, for example, a page designed to appear similar to and request the same information (e.g., data input) as legitimate page 408 (e.g., the legitimate account login request page associated with the service computer system). As phishing page 406 is generated by an attacker using computing device 104, IP addresses and/or other information such as location are generally different for phishing page 406 than similar information on computing device 401.

When user 402 provides his/her authentication information on phishing page 406 (such as username and password), the phishing page may forward the information in real-time to legitimate page 408 (which is associated with or controlled by service computer system 102) and enter the information as part of the initial authentication step. The information and initial authentication step may be provided to legitimate page 408 either directly from phishing page 406 on the web browser itself or through computing device 104 (e.g., by an attacker using computing device 104). As phishing page 406, which is associated with computing device 104, is providing the initial authentication step to legitimate page 408, information about phishing page 406 and computing device 104 (such as IP address or other information described herein) may be included as part of the initial authentication step.

At service computer system 102, the initial authentication step and the included information are received. As the information received in the initial authentication step is the actual authentication information for user 402, the service computer system 102 confirms the initial authentication step as legitimate. With a 2FA process in place on service computer system 102, the service computer system then generates a request for subsequent authentication step 410 (e.g., a second factor authentication request) to computing device 106, which is a computing device known to be associated with user 402. For example, computing device 106 may have been indicated as a trusted device for user 402 during setup of the user's account on service computer system 102. Service computer system 102 provides the request to computing device 106 such that user 402 may complete subsequent authentication step 410 on computing device 106.

In the illustrated embodiment, user 402 approves subsequent authentication step 410 on computing device 106 and the attacker is authenticated to service computer system 102. The attacker thereby gains access to service computer system 102 in authenticated attacker session 412. In certain instances, in order to conceal the attack, the user is redirected to legitimate page 408 by phishing page 406 (or computing device 104) and prompted to retry the authentication process. The user may then be authenticated in the retry (with or without subsequent authentication step 410 being completed during the retry) and gains access to the service computer system in authenticated user session 414. Directing user 402 to retry the authentication process conceals that the attacker was authenticated in the previous attempt as the user may be led to believe that user error was responsible for the need to retry the authentication process. In some instances, attack 400 may be described as a "man-in-the-middle" attack as phishing page 406 operates as an intermediary between user 402 and legitimate page 408.

Figure 5:
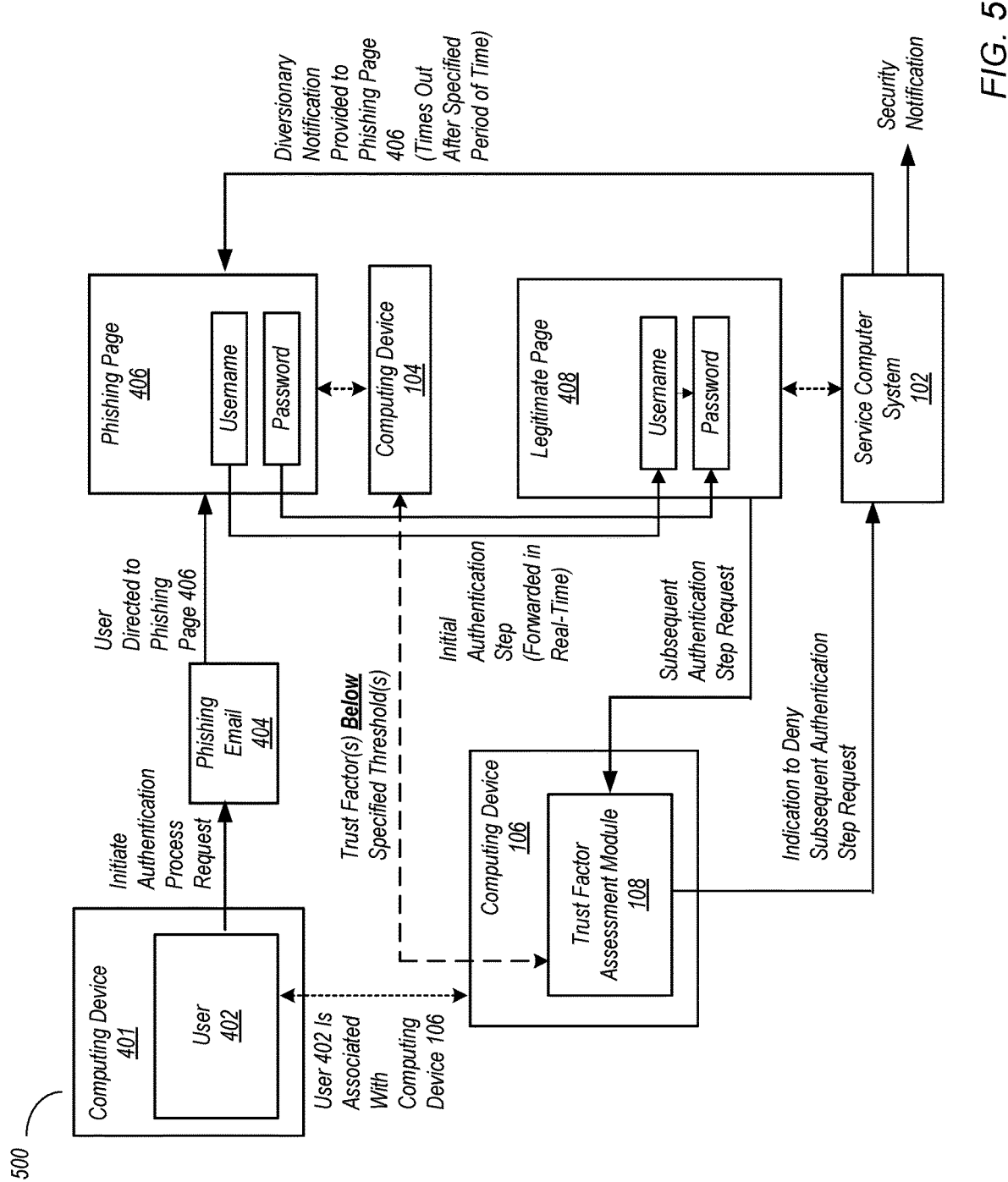
FIG. 5 depicts a block diagram of a system for detecting and preventing a phishing attack attempting to overcome a 2FA process using a trust factor assessment module, according to some embodiments.

As described herein, trust factor assessment module 108 (shown in FIGS. 1 and 3) may be implemented on computing device 106 to detect and prevent phishing attacks such as attack 400 depicted in FIG. 4. FIG. 5 depicts a block diagram of a system for detecting and preventing a phishing attack attempting to overcome a 2FA process using trust factor assessment module 108 on computing device 106, according to some embodiments. In attack defense 500, trust factor assessment module 108 is implemented on computing device 106. Thus, when computing device 106 receives the subsequent authentication step request from service computer system 102, the request is received in trust factor assessment module 108. Information about phishing page 406 or computing device 104 is included in the subsequent authentication step request, as described herein. The information about phishing page 406 or computing device 104 is included in the initial authentication step between phishing page 406 and legitimate page 408, as described above.

In attack defense 500, trust factor assessment module 108 assesses that the trust factor(s) between computing device 106 and computing device 104 fail to satisfy the specified threshold(s). This lack of trust between computing device 106 and computing device 104 may be indicative of a phishing attack on user 402. With the trust factor(s) failing to satisfy the specified threshold(s), trust factor assessment module 108 may deny the subsequent authentication step from being implemented on computing device 106, as described herein. Additionally, as shown in FIG. 5, trust factor assessment module 108 provides an indication to deny the subsequent authentication step request to service computer system 102. In some embodiments, service computer system 102 denies computing device 104 from accessing the service computer system (via an authentication process) in response to receiving the indication to deny from computing device 106.

In certain embodiments, service computer system 102 provides a diversionary notification to phishing page 406 (associated with computing device 104) in response to receiving the indication to deny the subsequent authentication step request from trust factor assessment module 108. The diversionary notification may be, for example, a fake "pending authentication" notification to phishing page 406. The diversionary notification may be used to mislead the attacker so that the attacker is unaware that the attack has been detected. After a specified period of time, the diversionary notification may be removed (e.g., stopped) to give the appearance that the request has timed-out, further disguising the detection of the attack. In some embodiments, service computer system 102 provides a security notification in response to receiving the indication to deny the subsequent authentication step request from trust factor assessment module 108. The security notification may be, for example, a notification to an owner or operator of service computer system 102 that a security incident (e.g., the phishing attack) has occurred so that further investigation may commence or steps such as blocking the IP address of phishing page 406 or computing device 104 are taken.

In some embodiments, service computer system 102 may take other actions to in response to receiving the indication to deny the subsequent authentication step. For example, other authentication steps may be implemented by service computer system 102 to determine an identity of computing device 104. These other authentication steps may be implemented to determine whether computing device 104 is part of a phishing attack (e.g., MITM attack) or whether there has been some change in the status of user 402 that has caused the trust factor(s) to fail to satisfy the specified threshold(s). In such instances, for example, user 402 may have recently moved, changed devices, or had some other change that has caused the assessed trust factor(s) to fail to satisfy the specified threshold(s). Thus, the other authentication steps implemented by service computer system 102 may be used to renew or ensure trust between computing device 106 and computing device 104.

Figure 6:
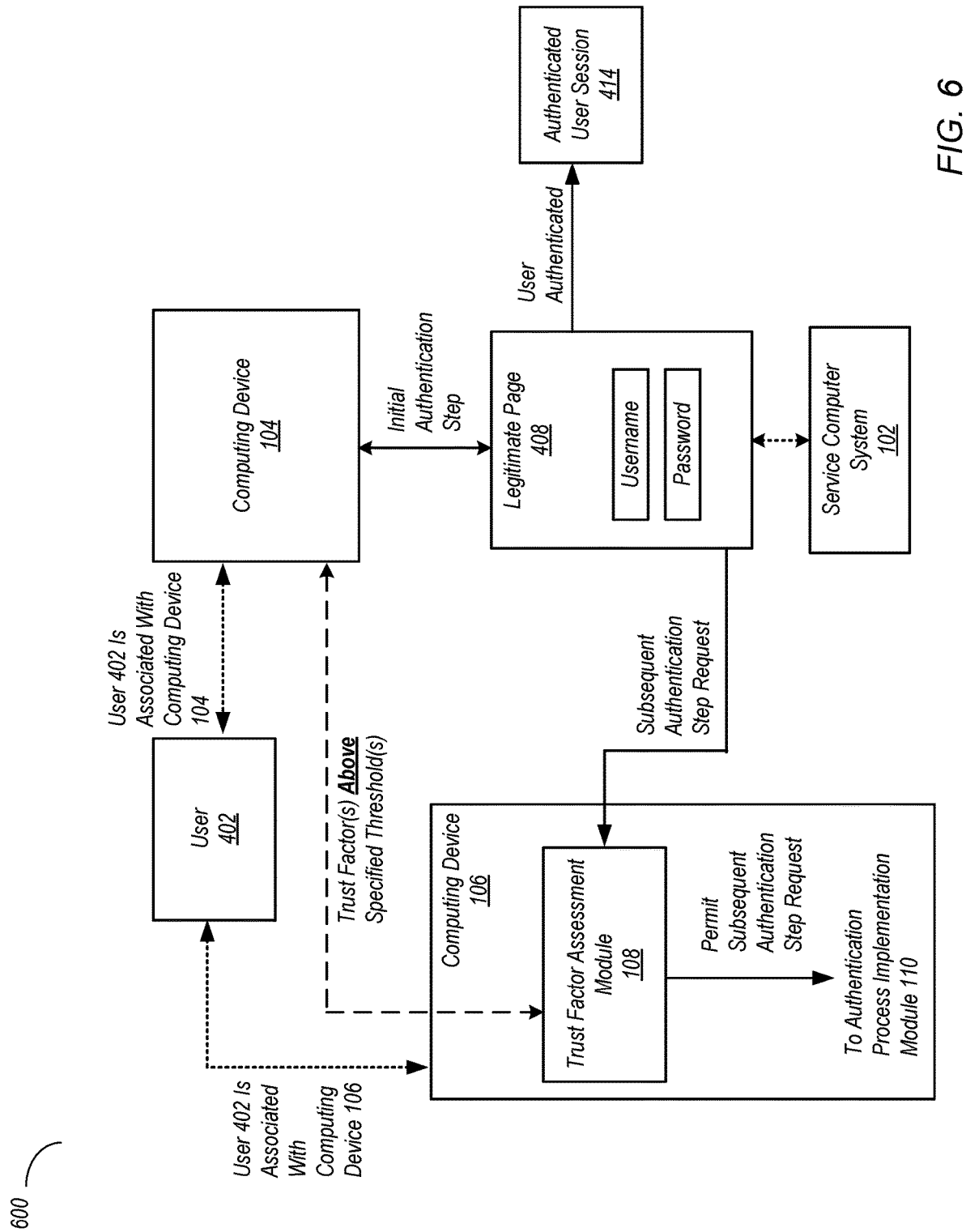
FIG. 6 depicts a block diagram of a system for processing a legitimate request involving a trust factor assessment module on a computing device.

As shown in FIG. 5, trust factor assessment module 108 (also shown in FIGS. 1 and 3) is implemented on computing device 106 to detect and prevent phishing attacks. Trust factor assessment module 108 is also implemented to allow legitimate access to service computer system 102. FIG. 6 depicts a block diagram of a system for processing a legitimate request involving trust factor assessment module 108 on computing device 106. In the illustrated embodiment of legitimate request 600, user 402 initiates and completes the initial authentication step to legitimate page 408 through computing device 104. For example, legitimate page 408 may be accessed by user 402 through a web browser on computing device 104 to initiate and complete the initial authentication step. The initial authentication step also includes information about computing device 104, as described herein.

In response to the initial authentication step, service computer system 102 generates the subsequent authentication request and sends the request to computing device 106. When computing device 106 receives the subsequent authentication step request from service computer system 102, the request is received in trust factor assessment module 108. Information about computing device 104 is included in the subsequent authentication step request, as described herein.

In legitimate request 600, trust factor assessment module 108 assesses that the trust factor(s) between computing device 106 and computing device 104 satisfies the specified threshold(s). Thus, there is a secure level of trust between computing device 106 and computing device 104 and computing device 104 is considered to be a trusted device. In some embodiments, as described above, computing device 106 and computing device 104 may already have established a trust that is known by trust factor assessment module 108. With the trust factor(s) satisfying the specified threshold(s), trust factor assessment module 108 permits the subsequent authentication step to be implemented on computing device 106. When the subsequent authentication step is completed and successful, the user is authenticated and granted access to service computer system 102 (through legitimate page 408) in authenticated user session 414.

Turning back to FIG. 1, in the illustrated embodiment, trust factor assessment module 108 sends the indication to permit the subsequent authentication step to authentication process implementation module 110 when the trust factor(s) satisfy the specified threshold(s) or there is previous trust between computing device 106 and computing device 104 known by trust factor assessment module 108. Authentication process implementation module 110 may then operate the subsequent authentication step through, for example, a user interface (UI) of computing device 106.

In certain embodiments, the subsequent authentication step includes requesting authentication information from the user and assessing the authentication information based on authentication information stored on computing device 106. For example, the subsequent authentication step may include requesting completion of a secondary step in an MFA or 2FA process that is authenticated by computing device 106 based on information stored on the device. In some embodiments, computing device 106 may contact and request information from service computer system 102 to complete the authentication step.

As shown in FIG. 1, system 100 includes the implementation of trust factor assessment module 108 on computing device 106 to assess trust factor(s) between computing device 106 and computing device 104 when computing device 104 provides an authentication process request to service computer system 102 in an attempt to access a user account on the service computer system. As described herein, the implementation of trust factor assessment module 108 on computing device 106 allows system 100 to permit or deny a subsequent authentication request (such as a secondary step in an MFA process or a 2FA process) based on a level of trust between computing device 106 and the computing device (e.g., computing device 104) making the request to service computer system 102. Implementing trust factor assessment module 108 on computing device 106 thus allows for detection and prevention of phishing attacks (such as man-in-the-middle attacks) in an MFA process or a 2FA process without reducing the user experience of legitimate access attempts to service computer system 102.

Example Methods

Figure 7:
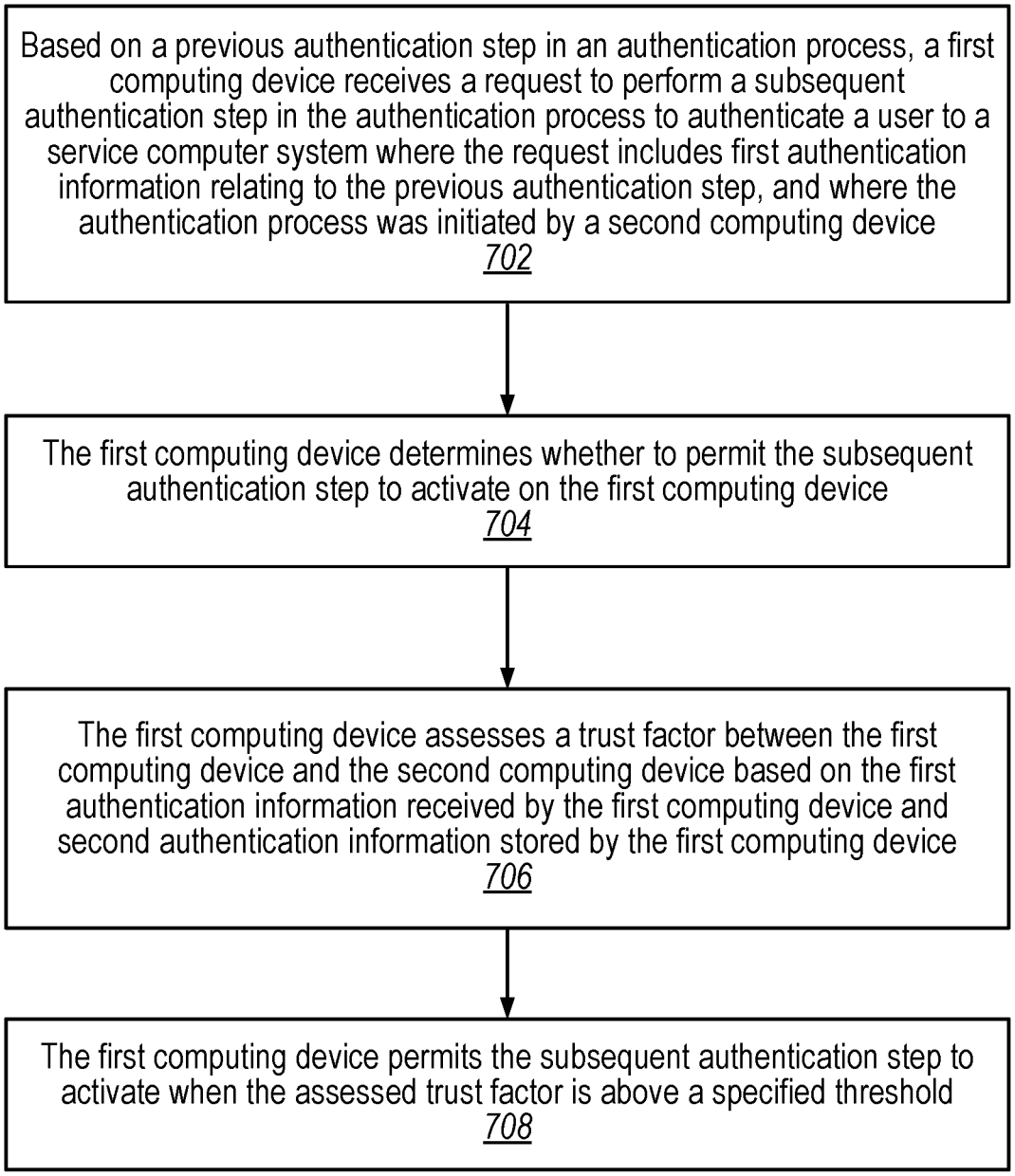
FIG. 7 is a flow diagram illustrating a method for determining whether to permit a subsequent authentication step, according to some embodiments.

FIG. 7 is a flow diagram illustrating a method for determining whether to permit a subsequent authentication step, according to some embodiments. The method shown in FIG. 7 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 1010, described below.

At 702, in the illustrated embodiment, after a previous authentication step in an authentication process, a first computing device receives a request to perform a subsequent authentication step in the authentication process to authenticate a user to a service computer system where the request includes first authentication information relating to the previous authentication step, and where the authentication process was initiated by a second computing device.

At 704, in the illustrated embodiment, the first computing device determines whether to permit the subsequent authentication step to be performed on the first computing device.

At 706, in the illustrated embodiment, the first computing device assesses a trust factor between the first computing device assesses a trust factor between the first computing device and the second computing device based on the first authentication information received by the first computing device and second authentication information stored by the first computing device. In some embodiments, assessing the trust factor between the first computing device and the second computing device includes assessing similarities between comparable data in the first authentication information and the second authentication information. In some embodiments, assessing the trust factor includes assessing individual trust factors for at least two comparable data and determining the trust factor based on a combination of the individual trust factors.

At 708, in the illustrated embodiment, the first computing device inhibits the subsequent authentication step from being performed based on the assessed trust factor. In some embodiments, the first computing device denies the subsequent authentication step from being performed based on the assessed trust factor. In some embodiments, determining whether to permit the subsequent authentication step to be performed on the first computing device includes assessing individual trust factors for at least two comparable data and inhibiting the subsequent authentication step from being performed on the first computing device when at least one individual trust factor fails to satisfy a specified threshold for the at least one individual trust factor. In some embodiments, the specified threshold is a value of the trust factor determined to correspond to a secure level of trust between the first computing device and the second computing device.

In some embodiments, the first computing device that the authentication process is associated with a man-in-the-middle attack based on the subsequent authentication step being inhibited. In some embodiments, the first computing device permits the subsequent authentication step to be performed on the first computing device in response to the assessed trust factor satisfying a specified threshold. In some embodiments, the first computing device transmits, to the service computer system, an indication of the determination of whether to permit the subsequent authentication step to be performed on the first computing device.

Figure 8:
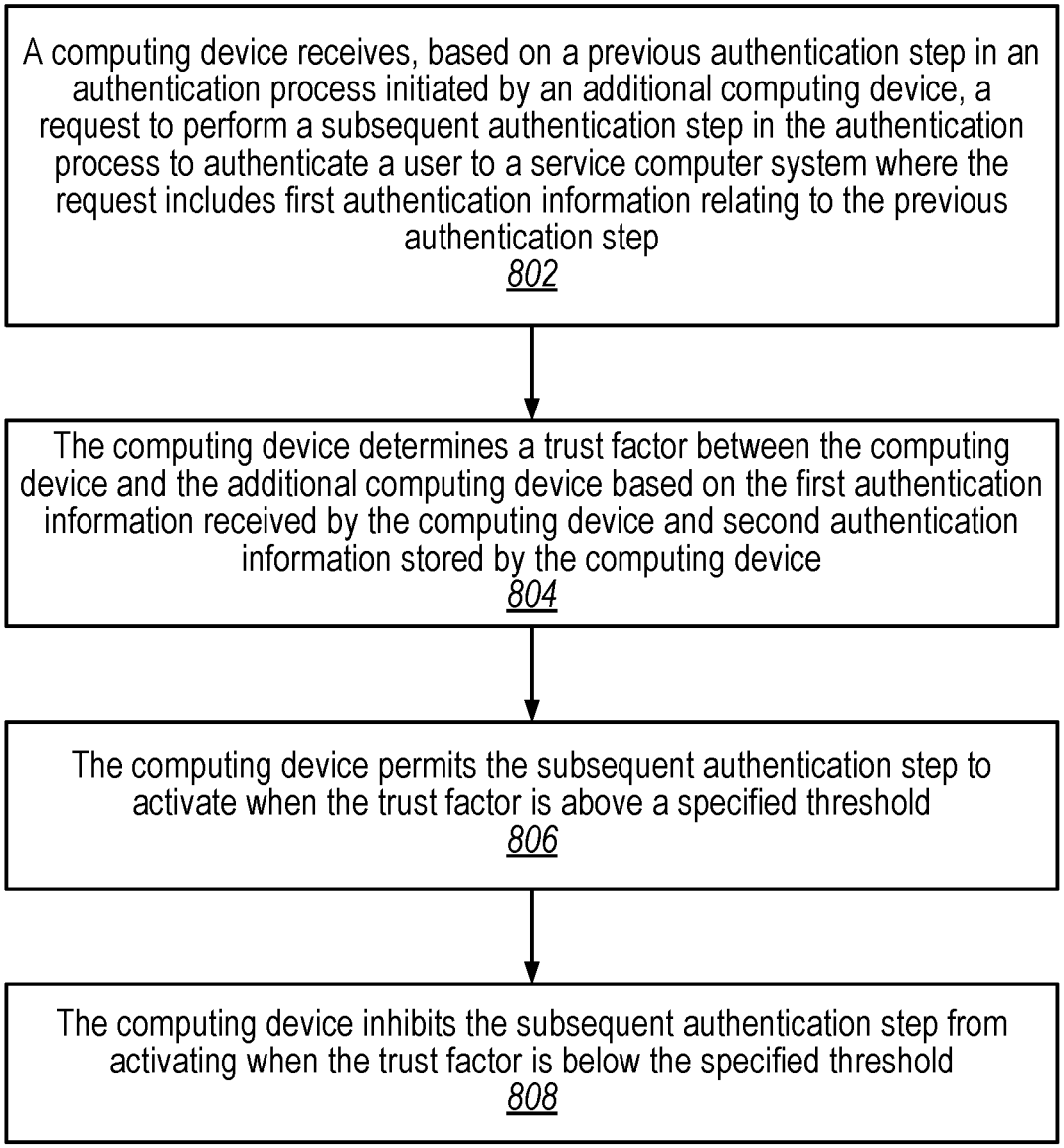
FIG. 8 is a flow diagram illustrating another method for determining whether to permit a subsequent authentication step, according to some embodiments, according to some embodiments.

FIG. 8 is a flow diagram illustrating another method for determining whether to permit a subsequent authentication step, according to some embodiments. The method shown in FIG. 8 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 1010, described below.

At 802, in the illustrated embodiment, a computing device receives, based on a previous authentication step in an authentication process initiated by an additional computing device, a request to perform a subsequent authentication step in the authentication process to authenticate a user to a service computer system where the request includes first authentication information relating to the previous authentication step.

At 804, in the illustrated embodiment, the computing device determines a trust factor between the computing device and the additional computing device based on the first authentication information received by the computing device and second authentication information stored by the computing device. In some embodiments, the trust factor is determined from an assessment of matching between comparable data in the first authentication information and the second authentication information. In some embodiments, the matching is determined for each of at least two comparable data where the trust factor is determined based on a combination of the determined matching for the at least two comparable data. In some embodiments, determining whether to permit the subsequent authentication step to be performed on the first computing device includes assessing individual trust factors for at least two comparable data and inhibiting the subsequent authentication step from being performed when each assessed individual trust factor fails to satisfy a specified threshold for the individual trust factor.

At 806, in the illustrated embodiment, in response to the trust factor satisfying a specified threshold, the computing device permits the subsequent authentication step to be performed. In some embodiments, the subsequent authentication step includes requesting authentication information from the user and assessing the authentication information from the user based on the second authentication information stored on the computing device.

At 808, in the illustrated embodiment, in response to the trust factor failing to satisfy a specified threshold, the computing device inhibits the subsequent authentication step from being performed. In some embodiments, the computing device, in response to inhibiting the subsequent authentication step from being performed, transmits to the service computer system an indication that the subsequent authentication step is being inhibited.

In some embodiments, the computing device stores the trust factor determined between the computing device and the additional computing device when the trust factor satisfies the specified threshold where the trust factor is accessed by the computing device in response to receiving at least one additional request to perform the subsequent authentication step for the authentication process initiated by the additional computing device.

Figure 9:
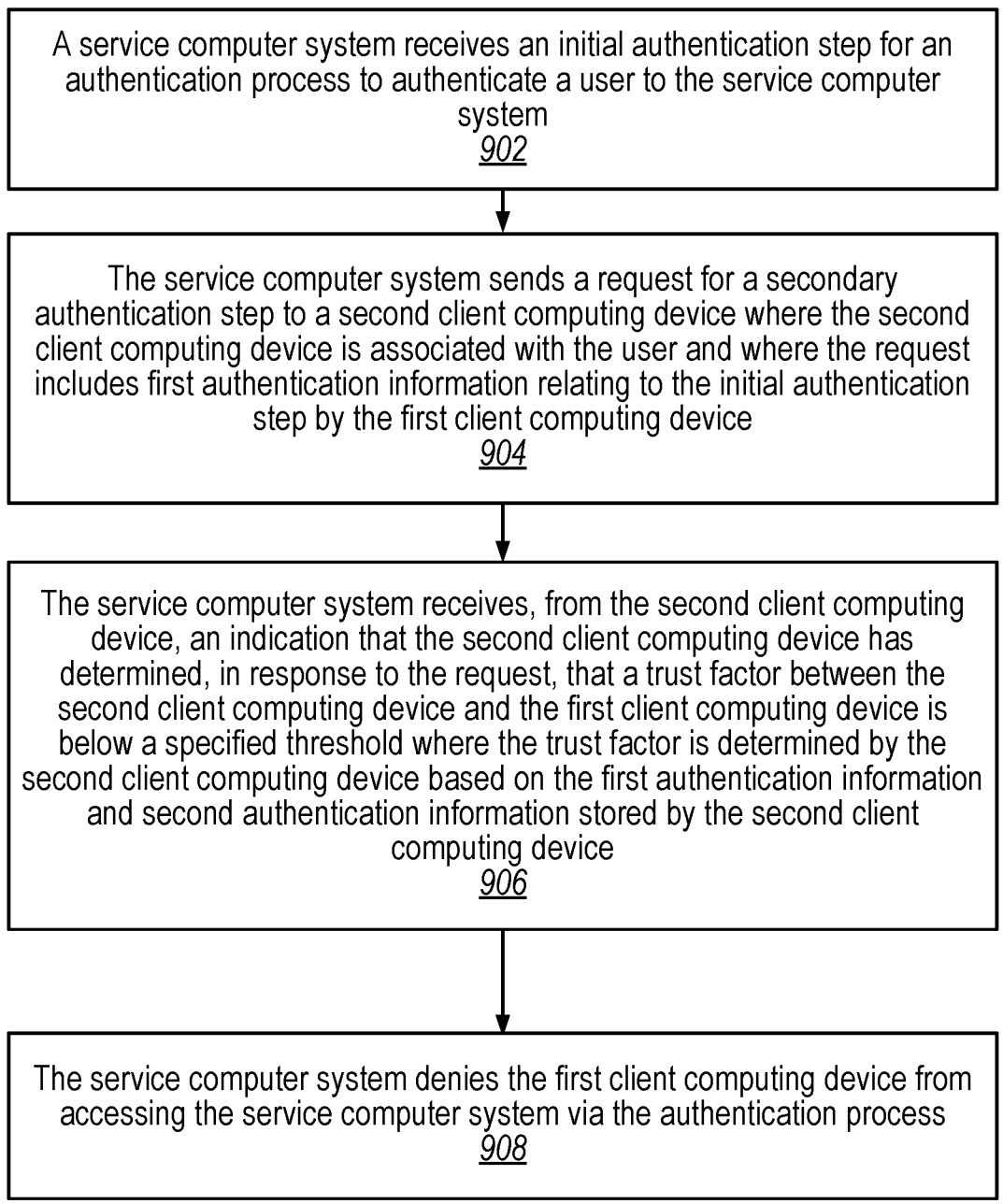
FIG. 9 is a flow diagram illustrating a method for denying a subsequent authentication step, according to some embodiments.

FIG. 9 is a flow diagram illustrating a method for denying a subsequent authentication step, according to some embodiments. The method shown in FIG. 9 may be used in conjunction with any of the computer circuitry, systems, devices, elements, or components disclosed herein, among other devices. In various embodiments, some of the method elements shown may be performed concurrently, in a different order than shown, or may be omitted. Additional method elements may also be performed as desired. In various embodiments, some or all elements of this method may be performed by a particular computer system, such as computing device 1010.

At 902, in the illustrated embodiment, a service computer system receives an initial authentication step for an authentication process to authenticate a user to the service computer system.

At 904, in the illustrated embodiment, the service computer system sends a request for a secondary authentication step to a second client computing device where the second client computing device is associated with the user and where the request includes first authentication information relating to the initial authentication step by the first client computing device.

At 906, in the illustrated embodiment, the service computer system receives, from the second client computing device, an indication that the second client computing device has determined, in response to the request, that a trust factor between the second client computing device and the first client computing device fails to satisfy a specified threshold where the trust factor is determined by the second client computing device based on the first authentication information and second authentication information stored by the second client computing device. In some embodiments, the indication received from the second client computing device is an indication of a man-in-the-middle attack on the service computer system by the first client computing device.

At 908, in the illustrated embodiment, based on the indication, the service computer system denies the first client computing device from accessing the service computer system via the authentication process. In some embodiments, the service computer system provides a diversionary notification to the first client computing device based on the indication received from the second client computing device. In some embodiments, the diversionary notification includes a notification that the authentication process is pending, and wherein the diversionary notification is removed after a specified period of time. In some embodiments, the service computer system initiates a security notification corresponding to first client computing device based on the indication received from the second client computing device.

Example Computer System

Figure 10:
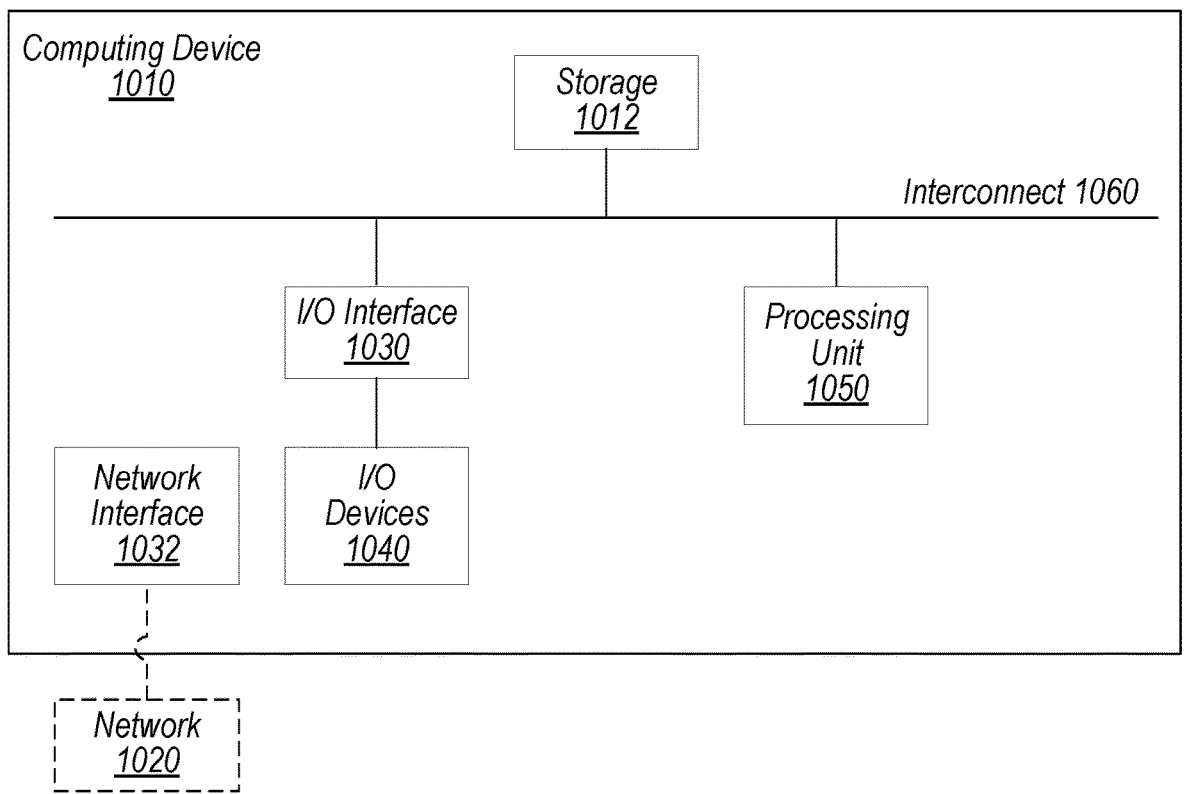
FIG. 10 is a block diagram of one embodiment of a computer system.

Turning now to FIG. 10, a block diagram of one embodiment of computing device (which may also be referred to as a computing system) 1010 is depicted. Computing device 1010 may be used to implement various portions of this disclosure. Computing device 1010 may be any suitable type of device, including, but not limited to, a personal computer system, desktop computer, laptop or notebook computer, mainframe computer system, web server, workstation, or network computer. As shown, computing device 1010 includes processing unit 1050, storage 1012, and input/output (I/O) interface 1030 coupled via an interconnect 1060 (e.g., a system bus). I/O interface 1030 may be coupled to one or more I/O devices 1040. Computing device 1010 further includes network interface 1032, which may be coupled to network 1020 for communications with, for example, other computing devices.

In various embodiments, processing unit 1050 includes one or more processors. In some embodiments, processing unit 1050 includes one or more coprocessor units. In some embodiments, multiple instances of processing unit 1050 may be coupled to interconnect 1060. Processing unit 1050 (or each processor within 1050) may contain a cache or other form of on-board memory. In some embodiments, processing unit 1050 may be implemented as a general-purpose processing unit, and in other embodiments it may be implemented as a special purpose processing unit (e.g., an ASIC). In general, computing device 1010 is not limited to any particular type of processing unit or processor subsystem.

As used herein, the term "module" refers to circuitry configured to perform specified operations or to physical non-transitory computer readable media that store information (e.g., program instructions) that instructs other circuitry (e.g., a processor) to perform specified operations. Modules may be implemented in multiple ways, including as a hardwired circuit or as a memory having program instructions stored therein that are executable by one or more processors to perform the operations. A hardware circuit may include, for example, custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices, or the like. A module may also be any suitable form of non-transitory computer readable media storing program instructions executable to perform specified operations.

Storage 1012 is usable by processing unit 1050 (e.g., to store instructions executable by and data used by processing unit 1050). Storage 1012 may be implemented by any suitable type of physical memory media, including hard disk storage, floppy disk storage, removable disk storage, flash memory, random access memory (RAM-SRAM, EDO RAM, SDRAM, DDR SDRAM, RDRAM, etc.), ROM (PROM, EEPROM, etc.), and so on. Storage 1012 may consist solely of volatile memory, in one embodiment. Storage 1012 may store program instructions executable by computing device 1010 using processing unit 1050, including program instructions executable to cause computing device 1010 to implement the various techniques disclosed herein.

I/O interface 1030 may represent one or more interfaces and may be any of various types of interfaces configured to couple to and communicate with other devices, according to various embodiments. In one embodiment, I/O interface 1030 is a bridge chip from a front-side to one or more back-side buses. I/O interface 1030 may be coupled to one or more I/O devices 1040 via one or more corresponding buses or other interfaces. Examples of I/O devices include storage devices (hard disk, optical drive, removable flash drive, storage array, SAN, or an associated controller), network interface devices, user interface devices or other devices (e.g., graphics, sound, etc.).

Various articles of manufacture that store instructions (and, optionally, data) executable by a computing system to implement techniques disclosed herein are also contemplated. The computing system may execute the instructions using one or more processing elements. The articles of manufacture include non-transitory computer-readable memory media. The contemplated non-transitory computer-readable memory media include portions of a memory subsystem of a computing device as well as storage media or memory media such as magnetic media (e.g., disk) or optical media (e.g., CD, DVD, and related technologies, etc.). The non-transitory computer-readable media may be either volatile or nonvolatile memory.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method, comprising:
    after a previous authentication step in an authentication process, receiving, at a first computing device from a service computer system, a request to perform a subsequent authentication step in the authentication process to authenticate a user to the service computer system, wherein the request includes first authentication information relating to the previous authentication step, and wherein the authentication process was initiated by a second computing device; and
    determining, by the first computing device, whether to permit the subsequent authentication step to be performed on the first computing device, wherein the determining includes:
        assessing a trust factor between the first computing device and the second computing device based on the first authentication information received by the first computing device and second authentication information stored by the first computing device; and
        inhibiting the subsequent authentication step from being performed on the first computing device based on the assessed trust factor.

2. The method of claim 1, further comprising determining that the authentication process is associated with a man-in-the-middle attack based on the subsequent authentication step being inhibited.

3. The method of claim 1, wherein assessing the trust factor between the first computing device and the second computing device includes assessing similarities between comparable data in the first authentication information and the second authentication information, wherein the comparable data includes at least one of the following comparable data:

internet protocol (IP) addresses corresponding to the first computing device and the second computing device;
geographic locations of the first computing device and the second computing device;
certificate information for the first computing device and the second computing device;
cookies associated with the first computing device and the second computing device; or
challenge keys associated with the first computing device and the second computing device.

4. The method of claim 3, wherein assessing the trust factor includes assessing individual trust factors for at least two comparable data and determining the trust factor based on a combination of the individual trust factors.

5. The method of claim 3, wherein determining whether to permit the subsequent authentication step to be performed on the first computing device includes:
    assessing individual trust factors for at least two comparable data; and
    inhibiting the subsequent authentication step from being performed on the first computing device when at least one individual trust factor fails to satisfy a specified threshold for the at least one individual trust factor.

6. The method of claim 1, further comprising permitting the subsequent authentication step to be performed on the first computing device in response to the assessed trust factor satisfying a specified threshold.

7. The method of claim 6, wherein the specified threshold is a value of the trust factor determined to correspond to a secure level of trust between the first computing device and the second computing device.

8. The method of claim 1, further comprising transmitting to the service computer system, by the first computing device, an indication of the determination of whether to permit the subsequent authentication step to be performed on the first computing device.

9. A non-transitory computer-readable medium having instructions stored thereon that are executable by a computing device to perform operations, comprising:
    based on a previous authentication step in an authentication process initiated by an additional computing device, receiving, at the computing device from a service computer system, a request to perform a subsequent authentication step in the authentication process to authenticate a user to the service computer system, wherein the request includes first authentication information relating to the previous authentication step;
    determining, by the computing device, a trust factor between the computing device and the additional computing device based on the first authentication information received by the computing device and second authentication information stored by the computing device;
    in response to the trust factor satisfying a specified threshold, permitting the subsequent authentication step to be performed; and
    in response to the trust factor failing to satisfy the specified threshold, inhibiting the subsequent authentication step from being performed.

10. The non-transitory computer-readable medium of claim 9, wherein the trust factor is determined from an assessment of matching between comparable data in the first authentication information and the second authentication information, wherein the comparable data includes at least one of the following comparable data:

IP addresses corresponding to the computing device and the additional computing device;
geographic locations of the computing device and the additional computing device;
certificate information for the computing device and the additional computing device;
cookies associated with the computing device and the additional computing device; or
challenge keys associated with the computing device and the additional computing device.

11. The non-transitory computer-readable medium of claim 10, wherein the matching is determined for each of at least two comparable data, and wherein the trust factor is determined based on a combination of the determined matching for the at least two comparable data.

12. The non-transitory computer-readable medium of claim 10, wherein determining whether to permit the subsequent authentication step to be performed on the first computing device includes:
    assessing individual trust factors for at least two comparable data; and
    inhibiting the subsequent authentication step from being performed when at least one individual trust factor fails to satisfy a specified threshold for the at least one individual trust factor.

13. The non-transitory computer-readable medium of claim 9, wherein the subsequent authentication step includes:
    requesting authentication information from the user; and
    assessing the authentication information from the user based on the second authentication information stored on the computing device.

14. The non-transitory computer-readable medium of claim 9, further comprising, in response to inhibiting the subsequent authentication step from being performed, transmitting to the service computer system an indication that the subsequent authentication step is being inhibited.

15. The non-transitory computer-readable medium of claim 9, further comprising storing, by the computing device, the trust factor determined between the computing device and the additional computing device when the trust factor satisfies the specified threshold, wherein the trust factor is accessed by the computing device in response to receiving at least one additional request to perform the subsequent authentication step for the authentication process initiated by the additional computing device.

16. A method, comprising:
    receiving, by a service computer system from a first client computing device, an initial authentication step for an authentication process to authenticate a user to the service computer system;
    sending, by the service computer system, a request for a secondary authentication step to a second client computing device, wherein the second client computing device is associated with the user, and wherein the request includes first authentication information relating to the initial authentication step by the first client computing device;
    receiving, by the service computer system from the second client computing device, an indication that the second client computing device has determined, in response to the request, that a trust factor between the second client computing device and the first client computing device fails to satisfy a specified threshold, wherein the trust factor is determined by the second client computing device based on the first authentication information and second authentication information stored by the second client computing device; and
    based on the indication, the service computer system denying the first client computing device from accessing the service computer system via the authentication process.

17. The method of claim 16, further comprising providing, by the service computer system, a diversionary notification to the first client computing device based on the indication received from the second client computing device.

18. The method of claim 17, wherein the diversionary notification includes a notification that the authentication process is pending, and wherein the diversionary notification is removed after a specified period of time.

19. The method of claim 16, further comprising initiating, by the service computer system, a security notification corresponding to first client computing device based on the indication received from the second client computing device.

20. The method of claim 16, wherein the indication received from the second client computing device is an indication of a man-in-the-middle attack on the service computer system by the first client computing device.

* * * * *